No. 814,734. PATENTED MAR. 13, 1906.
E. A. SCHADE.
SCREW DRIVER.
APPLICATION FILED APR. 20, 1905.
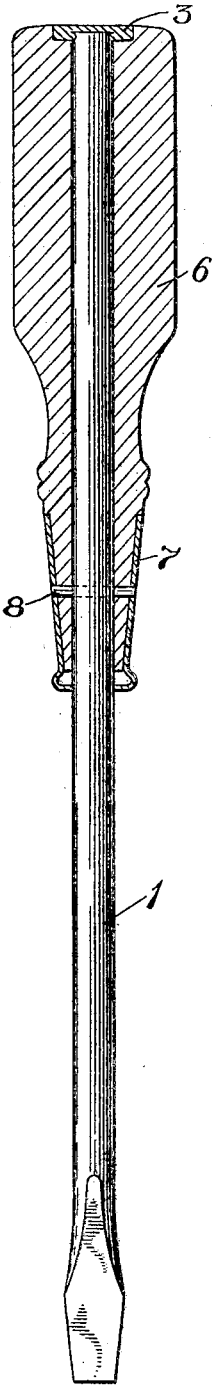
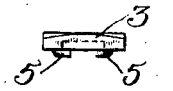
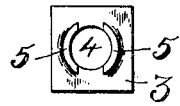
WITNESSES:
INVENTOR.
E. A. SCHADE
BY
ATTORNEYS

UNITED STATES PATENT OFFICE.

EDMUND A. SCHADE, OF NEW BRITAIN, CONNECTICUT, ASSIGNOR TO STANLEY RULE & LEVEL COMPANY, OF NEW BRITAIN, CONNECTICUT, A CORPORATION OF CONNECTICUT.

SCREW-DRIVER.

No. 814,734.     Specification of Letters Patent.     Patented March 13, 1906.

Application filed April 20, 1905. Serial No. 256,534.

*To all whom it may concern:*

Be it known that I, EDMUND A. SCHADE, a citizen of the United States, residing at New Britain, Hartford county, Connecticut, have invented certain new and useful Improvements in Screw-Drivers, of which the following is a full, clear, and exact description.

My invention relates to a new and improved construction of hand-tools, such as screw-drivers.

The object of my invention is to construct a screw-driver economically, but of great strength, rigidity, and durability.

My invention contemplates a tool having a round shank with recesses at its upper end. An angular cap (shown in the drawings as having four sides) is provided with a recess for receiving the end of the shank and also lugs or projections that permanently fasten the cap to the shank. The shank and cap are rigidly connected in the above manner, after which the shank is driven through a passage in the handle and securely fastened to same, the cap being seated in a recess in the end of the handle. The other end of the shank is then formed into the desired shape. (Shown as a screw-driver in the drawings.)

Figure 1 is a longitudinal section of a screw-driver embodying my invention. Fig. 2 is a view of the upper end of shank, showing recesses in end of same. Fig. 3 is a side view of the angular cap, showing lugs or projections in their original form before assembling. Fig. 4 is a bottom plan view of same.

1 is a shank, preferably of tool-steel, having at its upper end recesses 2 2.

3 is an angular metal cap provided with a recess 4, that receives the end of shank 1. The lugs or projections 5 5 are forced into the recesses 2 2, as shown in Fig. 1. The above operation is performed by suitable dies, thereby forming a rigid and permanent construction.

6 is the handle of the tool, of any desired construction, preferably of wood, in which a longitudinal passage is formed and which has a pocket shaped to correspond to the angular cap 3 and afford a seat therefor.

7 is a ferrule which may be employed to prevent the handle from splitting when under strain.

8 is a pin to assist in securing the shank and ferrule to the handle 6.

It is obvious that with the above construction a blow on the cap 3 would be conveyed directly to the shank 1 without any material injury to the handle. The shank is prevented from turning in the handle. The cap 3 may be formed of softer and cheaper metal than the shank 1, thereby reducing cost of production.

What I claim is—

A hand-tool comprising a handle member having a longitudinal passage with an angular pocket at one end, a round metal shank having a side recess near the upper end, said shank being carried by said handle member, and an angular metal cap seated in the pocket in said handle member and having a recess for the upper end of said shank with an integral projecting portion fitted into the side recess in the upper end of said shank and permanently and rigidly uniting the metal parts and preventing the independent rotation of handle and shank.

EDMUND A. SCHADE.

Witnesses:
   W. J. WORAM,
   A. L. WIARD.